(12) United States Patent
Oguro et al.

(10) Patent No.: US 9,457,314 B2
(45) Date of Patent: Oct. 4, 2016

(54) FLUID SEPARATION APPARATUS AND METHOD OF SELECTIVELY SEPARATING MIXED FLUID

(75) Inventors: Syuichi Oguro, Kanagawa (JP); Nobuhiro Yamada, Ibaraki (JP); Yasushi Fujimura, Kanagawa (JP)

(73) Assignee: JGC CORPORATION, Tokyo (JP)

( * ) Notice: Subject to any disclaimer, the term of this patent is extended or adjusted under 35 U.S.C. 154(b) by 275 days.

(21) Appl. No.: 14/353,293

(22) PCT Filed: Oct. 28, 2011

(86) PCT No.: PCT/JP2011/075004
§ 371 (c)(1),
(2), (4) Date: Apr. 22, 2014

(87) PCT Pub. No.: WO2013/061474
PCT Pub. Date: May 2, 2013

(65) Prior Publication Data
US 2014/0283683 A1    Sep. 25, 2014

(51) Int. Cl.
*B01D 53/22* (2006.01)
*B01D 63/06* (2006.01)
*B01D 71/02* (2006.01)

(52) U.S. Cl.
CPC .......... *B01D 53/226* (2013.01); *B01D 53/225* (2013.01); *B01D 63/06* (2013.01);
(Continued)

(58) Field of Classification Search
CPC .. B01D 71/024; B01D 63/066; B01D 63/06; B01D 53/226; B01D 53/225; B01D 2319/04; B01D 2319/022; B01D 2315/10; B01D 2313/56; B01D 2313/20; B01D 2313/13; B01D 2313/04; B01D 2257/504; B01D 2256/245; B01D 2053/223; Y02C 10/10
See application file for complete search history.

(56) References Cited

U.S. PATENT DOCUMENTS

| | | | | |
|---|---|---|---|---|
| 2,455,645 | A | * | 12/1948 | Barton ................. A61J 1/1412 137/559 |
| 2,921,686 | A | * | 1/1960 | Forman ................ B01D 29/114 210/323.2 |

(Continued)

FOREIGN PATENT DOCUMENTS

| | | |
|---|---|---|
| AU | 2011380049 | 6/2014 |
| CN | 1703270 | 11/2005 |

(Continued)

OTHER PUBLICATIONS

Brogan "Heat Exchangers" Feb. 13, 2011, p. 1 http://www.thermopedia.com/content/832/.*

(Continued)

*Primary Examiner* — Anthony Shumate
(74) *Attorney, Agent, or Firm* — Jianq Chyun IP Office

(57) ABSTRACT

A fluid separation apparatus is described, including a casing and a separation module. The casing includes a mixed fluid inlet, a separated fluid outlet through which a selectively separated fluid is discharged, and a residual fluid outlet. The separation module has a set of serially arranged separation elements disposed therein and is insertable into the casing from an end of the casing. The separation module includes a first connection jig disposed between adjacent separation elements, second connection jigs disposed at two ends of the set of serially arranged separation elements, and a coupling jig coupling the first and the second connection jigs to each other.

16 Claims, 14 Drawing Sheets

(52) U.S. Cl.
CPC ......... *B01D 63/066* (2013.01); *B01D 71/024* (2013.01); *B01D 2053/223* (2013.01); *B01D 2256/245* (2013.01); *B01D 2257/504* (2013.01); *B01D 2313/04* (2013.01); *B01D 2313/13* (2013.01); *B01D 2313/20* (2013.01); *B01D 2313/56* (2013.01); *B01D 2315/10* (2013.01); *B01D 2319/022* (2013.01); *B01D 2319/04* (2013.01); *Y02C 10/10* (2013.01)

(56) References Cited

U.S. PATENT DOCUMENTS

| | | | | |
|---|---|---|---|---|
| 3,178,355 | A * | 4/1965 | Jacobs | F01D 9/042 210/767 |
| 3,211,368 | A * | 10/1965 | Sbanely | B01D 17/0217 494/10 |
| 3,443,366 | A * | 5/1969 | Schwab | B01D 46/02 210/315 |
| 3,768,660 | A * | 10/1973 | Block | B01D 61/08 210/321.87 |
| 4,293,419 | A * | 10/1981 | Sekino | B01D 53/22 210/321.88 |
| 4,657,743 | A * | 4/1987 | Kanno | A61M 1/1698 210/321.64 |
| 4,781,832 | A * | 11/1988 | Takemura | B01D 63/02 210/321.8 |
| 5,048,601 | A * | 9/1991 | Yamaguchi | B01J 8/067 165/140 |
| 5,071,552 | A * | 12/1991 | Bikson | B01D 63/043 210/321.8 |
| 6,702,941 | B1 | 3/2004 | Haq et al. | |
| 7,150,830 | B1 * | 12/2006 | Katsube | B01D 63/043 210/321.79 |
| 7,413,668 | B2 * | 8/2008 | Reid | B01D 35/301 210/232 |
| 7,449,110 | B2 * | 11/2008 | Sugiura | B01D 63/061 210/321.78 |
| 8,506,685 | B2 * | 8/2013 | Taylor | B01D 19/0031 95/46 |
| 8,945,387 | B2 * | 2/2015 | Adams | C02F 1/44 210/321.69 |
| 2002/0027103 | A1 | 3/2002 | Ando et al. | |
| 2004/0089960 | A1 | 5/2004 | Isozaki et al. | |
| 2006/0123753 | A1 * | 6/2006 | Sugiura | B01D 63/61 55/482 |
| 2009/0049808 | A1 * | 2/2009 | Kawaguchi | B01D 46/04 55/304 |
| 2014/0027370 | A1 * | 1/2014 | Kobayashi | B01D 63/106 210/321.83 |
| 2014/0283683 | A1 | 9/2014 | Oguro et al. | |
| 2014/0318372 | A1 * | 10/2014 | Butterfield | B01D 71/028 96/8 |
| 2015/0144555 | A1 * | 5/2015 | Lange | B01D 29/52 210/636 |

FOREIGN PATENT DOCUMENTS

| | | |
|---|---|---|
| JP | 10-109022 | 4/1998 |
| JP | 2002-095931 | 4/2002 |
| JP | 2004-261649 | 9/2004 |
| JP | 2010-194537 | 9/2010 |
| JP | 2011-189335 | 9/2011 |
| RU | 2327509 | 6/2008 |
| WO | 2013061474 | 5/2013 |

OTHER PUBLICATIONS

"International Search Report (Form PCT/ISA/210)", mailed on Jan. 31, 2012, pp. 1-4.

"Written Opinion of the International Searching Authority (Form PCT/ISA/237)", mailed on Jan. 31, 2012, with English translation thereof, p. 1-8.

"Decision on Grant of Russian Counterpart Application", issued on Oct. 29, 2015, with English translation thereof, pp. 1-15.

"Office Action of China Counterpart Application", issued on Jun. 1, 2015, with English translation thereof, pp. 1-10.

"Office Action of Canadian Counterpart Application," issued on Aug. 3, 2015, p. 1-p. 3.

* cited by examiner

FLUID SEPARATION APPARATUS AND METHOD OF SELECTIVELY SEPARATING MIXED FLUID

CROSS-REFERENCE TO RELATED APPLICATION

This application is a 371 application of an International PCT application serial no. PCT/JP2011/075004, filed on Oct. 28, 2011. The entirety of the above-mentioned patent application is hereby incorporated by reference herein and made a part of this specification.

TECHNICAL FIELD

This invention relates to a fluid separation apparatus that selectively separates a specific fluid component from a fluid such as a gas or water. In particular, this invention relates to a fluid separation apparatus that increases separation capability by serially arranging separation elements, and a method of selectively separating a mixed fluid by using the fluid separation apparatus.

BACKGROUND ART

In recent years, membrane separation technology has been used in the field of processing a large amount of fluid, such as gas separation and city water treatment, due to the advantage in terms of low initial cost. In particular, apparatuses including a separation element disposed in a casing are used, and the separation element is typically made from a ceramic material because a ceramic separation element has advantages such as being easy to clean, being durable, and so on.

The separation element includes a membrane, a supporter of the membrane, a channel member and so on that are integrated with each other, while the shape of the separation element may vary depending on the purpose of separation.

A gas separation apparatus has been disclosed (in Patent Document 1 described later) that includes a gas separator (corresponding to the above "separation element") having a gas separation membrane, which allows only a specific gas component to pass therethrough, disposed on a surface of a porous base member. When separating a high-temperature gas, the closeness of contact between the gas separator and a fixing member for fixing the gas separator may become insufficient due to thermal expansion of the gas separator and the fixing member, and thereby gas leakage may occur. If such gas leakage occurs, a specific gas component that has passed through the gas separation membrane may become mixed with residual gas components, so that the specific gas component cannot be efficiently separated.

To prevent this, the gas separation apparatus disclosed in Patent Document 1 includes a gas separator, a container having a recess in which the gas separator is contained, a seal member disposed in the gap between the outer peripheral surface of the gas separator and a side wall, and a clamping member that clamps and presses the seal member in an axial direction in the gap. The ratio of the thermal expansion coefficient of the container to that of the gas separator is in the range of 0.55 to 0.95, so that the occurrence of gas leakage from a joint portion between the gas separator and a member that immovably holds the gas separator is suppressed.

The flow rate of a fluid that passes through a fluid separation membrane is limited to a certain range for the purpose of realizing desired separation ability. The higher the separation processing flow rate, the larger the membrane area needed. Therefore, although a single separation element can be used as a unit, in a case of processing a large amount of water in a water treatment plant or processing a large amount of fluid for gas separation, a large number of separation elements are serially arranged so as to increase the membrane area and improve the separation capability.

For this purpose, a fluid separation apparatus has been disclosed that includes a plurality of separation elements, each of which is contained in a corresponding one of casings that are serially connected to each other using flanges, so as to increase the filtration area and increase the water separation capability (Patent Document 2 described below).

CITATION LIST

Patent Documents

Patent Document 1: Japanese Laid-open Patent Publication No. 2011-189335
Patent Document 2: Japanese Laid-open Patent Publication No. 2004-261649

SUMMARY OF THE INVENTION

Problems to be Solved by this Invention

A fluid separation apparatus including serially arranged separation elements has a separation capability higher than that of a fluid separation apparatus including a single separation element. However, when the number of separation elements is increased to increase the membrane area and the separation capability, the number of flange portions increases in proportion to the number of separation elements and the weight of the entirety of the fluid separation apparatus increases.

Moreover, when maintenance of the fluid separation apparatus or repair or replacement of the separation elements needs to be performed, the flange portions need to be disassembled and assembled for each of the separation elements in the casings, so that it is not easy to replace the separation elements. In addition, during disassembly and assembly, the separation elements, which are made from ceramic, may become broken and unusable, and therefore replacement and repair of the elements may become difficult.

To solve the above problem, an object of an aspect of this invention is to reduce the weight of a fluid separation apparatus and facilitate the maintenance of the fluid separation apparatus by making a separation module including a plurality of serially arranged separation elements be insertable and removable from one end of a casing.

Means for Solving the Problems

Embodiments for solving the problems are described below.

Item 1 is a fluid separation apparatus that selectively separates a specific fluid component from a mixed fluid, which comprises: a casing that includes a mixed fluid inlet, a separated fluid outlet through which a selectively separated fluid is discharged, and a residual fluid outlet through which a residual fluid that remains after the selective separation has been performed is discharged; and a separation module in which a set of a plurality of serially arranged separation elements is disposed, each of the separation elements having a channel through which the mixed fluid flows in an axial direction and selectively separating the specific fluid component as a cross flow perpendicular to the flow direction of the mixed fluid, the separation module being insertable into the casing from an end of the casing. The separation module includes a first connection jig, second connection jigs and a coupling jig. The first connection jig is disposed between adjacent separation elements so as to isolate the space around outer peripheral surfaces of the separation elements from the space between the separation elements, has an opening through which the channels are connected to each other, and has a disk-like shape having an outer diameter larger than the outer diameter of the separation elements. The second connection jigs are disposed at two ends of the set of the plurality of serially arranged separation elements such that each second connection jig isolates the space adjacent to an end surface of the set of the serially arranged separation elements from the space around the outer peripheral surfaces of the separation elements. Each second connection jig has an opening through which the space adjacent to the end surface is connected to a corresponding one of the channels, and has a disk-like shape having an outer diameter larger than the outer diameter of the separation elements. The coupling jig couples the first and the second connection jigs to each other.

Item 2 is the fluid separation apparatus of Item 1 further comprising: a seal member that isolates the space adjacent to the end surface of the set of the plurality of serially arranged separation elements from the space around the outer peripheral surfaces of the separation elements by contacting the second connection jigs and an inner peripheral surface of the casing.

Item 3 is the fluid separation apparatus of Item 1 or 2 in which the casing includes an inlet-side cover member in which the mixed fluid inlet is formed, an outlet-side cover member in which the residual fluid outlet is formed, and a cylindrical body in which the separated fluid outlet is formed and in which the separation module is inserted, at least one of the inlet-side cover member and the outlet-side cover member being sealingly connectable to the cylindrical body using a flange. The fluid separation apparatus further comprises a fixing member disposed between the inlet-side cover member or the outlet-side cover member and the cylindrical body. The fixing member has a disk-like shape having an opening, and includes a protrusion that protrudes toward a center of the opening from a position corresponding to an inner peripheral surface of the casing and contacts the second connection jig.

Item 4 is the fluid separation apparatus of any one of Items 1 to 3 in which the casing includes an inlet-side cover member in which the mixed fluid inlet is formed, an outlet-side cover member in which the residual fluid outlet is formed, and a cylindrical body in which the separated fluid outlet is formed and in which the separation module is inserted, at least one of the inlet-side cover member and the outlet-side cover member being sealingly connectable to the cylindrical body using a flange, and in which each second connection jig is disposed in the cylindrical body such that the second connection jig is removable after the inlet-side cover member or the outlet-side cover member has been removed.

Item 5 is the fluid separation apparatus of any one of Items 1 to 4 in which the casing has a wall thickness with which the casing is capable of holding a fluid having a pressure in the range of 1 to 15 MPaA.

Item 6 is the fluid separation apparatus of any one of Items 1 to 5 in which one of the second connection jigs has an outer diameter larger than the inner diameter of the casing and is capable of being integrally fixed to the casing using the flange, and the other of the second connection jigs has an outer diameter smaller than the inner diameter of the casing.

Item 7 is the fluid separation apparatus of any one of Items 1 to 6 in which the coupling jig is a rod whose length in the axial direction is adjustable and that has a joint portion including a bolt and a nut.

Item 8 is the fluid separation apparatus of any one of Items 1 to 7 in which the coupling jig is cylindrical.

Item 9 is the fluid separation apparatus of any one of Items 1 to 8 in which a plurality of sets of the plurality of serially arranged separation elements are parallelly arranged in the separation module.

Item 10 is a method of selectively separating a mixed fluid using a fluid separation apparatus that selectively separates a specific fluid component from the mixed fluid. The fluid separation apparatus including a casing that includes a mixed fluid inlet, a separated fluid outlet through which a selectively separated fluid is discharged, and a residual fluid outlet through which a residual fluid that remains after the selective separation has been performed is discharged; and a separation module in which a set of a plurality of serially arranged separation elements is disposed, each of the separation elements having a channel through which the mixed fluid flows in an axial direction and selectively separating the specific fluid component as a cross flow perpendicular to a flow direction of the mixed fluid. The separation module is insertable into the casing from an end of the casing, and includes a first connection jig, second connection jigs and a coupling jig. The first connection jig is disposed between adjacent separation elements so as to isolate the space around the outer peripheral surfaces of the separation elements from the space between the separation elements, has an opening through which the channels are connected to each other, and has a disk-like shape having an outer diameter larger than the outer diameter of the separation elements. The second connection jigs are disposed at two ends of the set of the plurality of serially arranged separation elements such that each second connection jig isolates the space adjacent to an end surface of the set of the serially arranged separation elements from the space around the outer peripheral surfaces of the separation elements. Each second connection jig has an opening through which the space adjacent to the end surface is connected to a corresponding one of the channels, and has a disk-like shape having an outer diameter larger than the outer diameter of the separation elements. The coupling jig couples the first and the second connection jigs to each other. The method comprises: selectively separating the specific fluid component as the cross flow perpendicular to the flow direction of the mixed fluid using the separation elements; isolating a fluid that has been selectively separated from the mixed fluid using the first connection jig; and isolating the selectively separated fluid from the mixed fluid using the second connection jigs.

Item 11 is the method of selectively separating a mixed fluid of Item 10 in which the mixed fluid has a pressure in the range of 1 to 15 MPaA.

A fluid separation apparatus of an embodiment of this invention is configured such that a separation module in which a plurality of serially arranged separation elements are disposed is insertable and removable from one end of the casing, so that the fluid separation apparatus is lightweight and has an advantage of easy maintenance. Thus, ease of replacement of separation elements and assembly of the fluid separation apparatus can be considerably increased.

EMBODIMENTS

Figure 1:
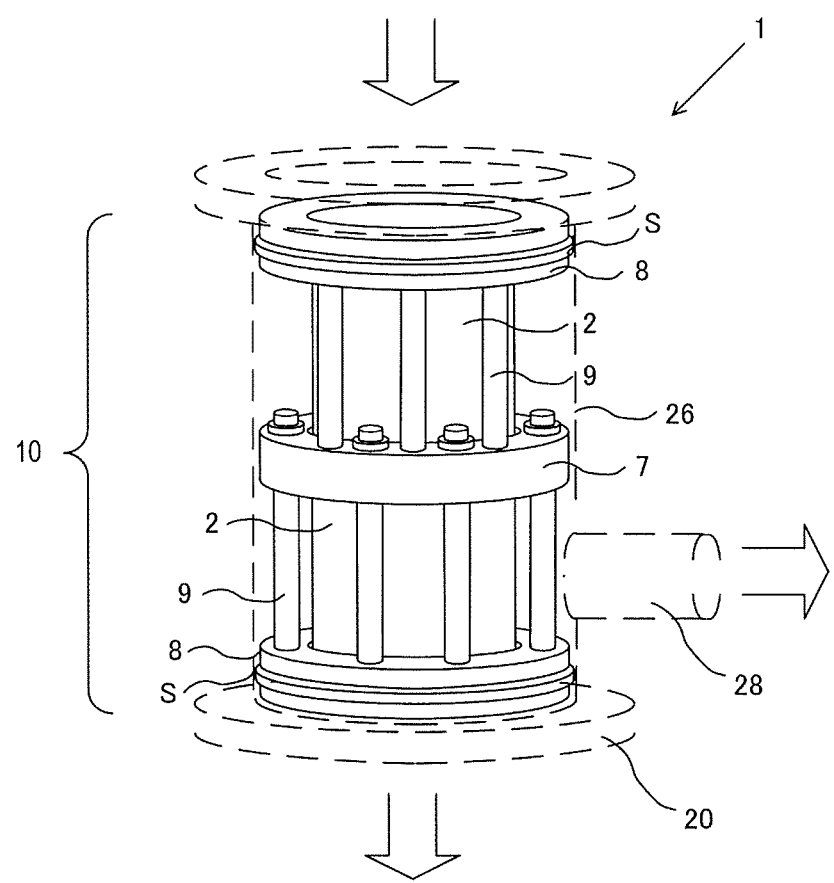
FIG. 1 is a perspective view illustrating an example of a fluid separation apparatus.

Hereinafter, an embodiment of this invention is described with reference to the drawings.
1. Fluid Separation Apparatus A fluid separation apparatus of this embodiment, which selectively separates a specific fluid component from a Mixed fluid, includes:

(A) a casing 20 that includes a mixed fluid inlet 21, a separated fluid outlet 28 through which a selectively separated fluid is discharged, and a residual fluid outlet 22 through which a residual fluid that remains after the selective separation has been performed is discharged; and (B) a separation module 10 in which a set of a plurality of serially arranged separation elements 2 is disposed, each of the separation elements 2 having a channel through which the mixed fluid flows in an axial direction and selectively separating the specific fluid component as a cross flow perpendicular to the flow direction of the mixed fluid, the separation module being insertable into the casing from an end of the casing.

The separation module includes:

(B1) a first connection jig 7 that is disposed between adjacent separation elements 2 so as to isolate the space around outer peripheral surfaces of the separation elements 2 from the space between the separation elements 2, has an opening through which the channels are connected to each other, and has a disk-like shape having an outer diameter larger than the outer diameter of the separation elements 2, (B2) second connection jigs 8 that are disposed at two ends of the set of the plurality of serially arranged separation elements 2 such that each second connection jig isolates the space adjacent to an end surface of the set of the serially arranged separation elements 2 from the space around the outer peripheral surfaces of the separation elements 2, each second connection jig 8 having an opening through which the space adjacent to the end surface is connected to a corresponding one of the channels and having a disk-like shape having an outer diameter larger than the outer diameter of the separation elements 2, and (B3) a coupling jig 9 that couples the first and the second connection jigs 7 and 8 to each other.

The fluid separation apparatus further includes:

(B4) a seal member S that isolates the space adjacent to the end surface of the set of the plurality of serially arranged separation elements 2 from the space around the outer peripheral surfaces of the separation elements 2 by contacting the second connection jigs 8 and an inner peripheral surface of the casing 20.

FIG. 1 is a perspective view illustrating an example of the fluid separation apparatus. In FIG. 1, a fluid separation apparatus 1 includes the casing 20 and the separation module 10, which are respectively shown by broken lines and solid lines.
(B) Separation Module The separation module 10 is insertable and removable from one end of the casing 20. The separation module 10 includes the first connection jig 7 and two second connection jigs 8. The first connection jig 7 is disposed between adjacent separation elements 2. Each of the second connection jigs 8 is disposed at a corresponding one of the ends of a set of the separation elements 2, which are coupled to each other. Each of the separation elements 2 is interposed between the first connection jig 7 and a corresponding one of the second connection jigs 8. The first connection jig 7 and the second connection jigs 8 are coupled to each other using coupling jigs 9. As a result, the separation elements 2 are integrated into the separation module 10, and thereby the separation elements 2 can be carried or transported not as individual separation elements 2 but as the separation module 10.

Each of the separation module 10 selectively separates a fluid that can pass through a separation membrane from a mixed fluid that flows into the casing 20 through the inlet of the casing 20. The separated fluid flows toward the outer periphery of the separation module 10, and is discharged through the separated fluid outlet 28. A residual fluid that remains after a part of the mixed fluid has been separated is discharged in the axial direction of the separation elements 2.

Each of the separation elements 2 has a channel through which a mixed fluid flows in the axial direction, and selectively separates a specific fluid component as a cross flow, which is perpendicular to the flow direction of the mixed fluid. The separation elements 2 are serially arranged in the separation module 10.

The separation element of this embodiment does not perform separation on the entire amount of fluid that is fed thereto. Instead, the separation element is a cross-flow separation element, to which a material fluid is fed as co-current flow, which is parallel to the membrane surface, and a specific fluid component is separated through the membrane in the direction perpendicular to the co-current flow. Therefore, the membrane area is increased and the separation capability is improved by serially coupling the separation elements together. For example, there are the following modifications of the separation element.

Figure 2A:
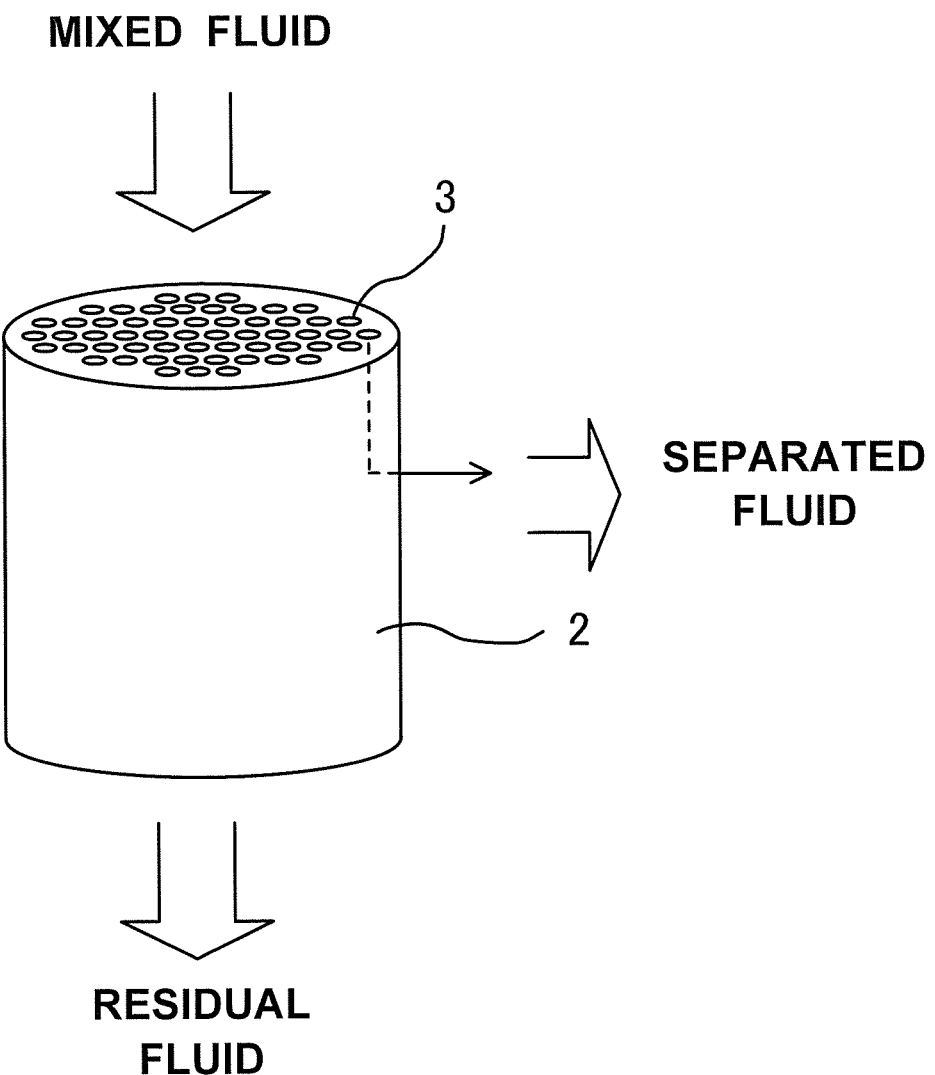
FIG. 2A illustrates an example of a monolithic separation element.

FIG. 2A illustrates an example of a monolithic separation element. Here, the term "monolithic" refers to a structure having a base member and porous membranes. The base member is a cylindrical porous body through which a plurality of through-holes, which serve as a fluid channel, extend in the axial direction. The porous membranes are formed on the inner walls of the through-holes and have an average pore diameter smaller that that of the base member. The separation element 2 illustrated in FIG. 2A includes a base member and separation membranes. The base member is a cylindrical porous body in which a plurality of through-holes 3, which serve as a mixed fluid channel, are formed. The separation membranes are thin membranes made from a porous material and formed on the inner walls of the through-holes 3 and/or on the outer peripheral surface of the porous body. The separation membranes have an average pore diameter smaller than that of the base member and allow a part of the mixed fluid to pass therethrough. When a mixed fluid passes through the through-holes, a specific fluid component of the mixed fluid that can pass through the separation membrane passes through the separation membrane and is discharged as a separated fluid in the radial direction.

Figure 2B:
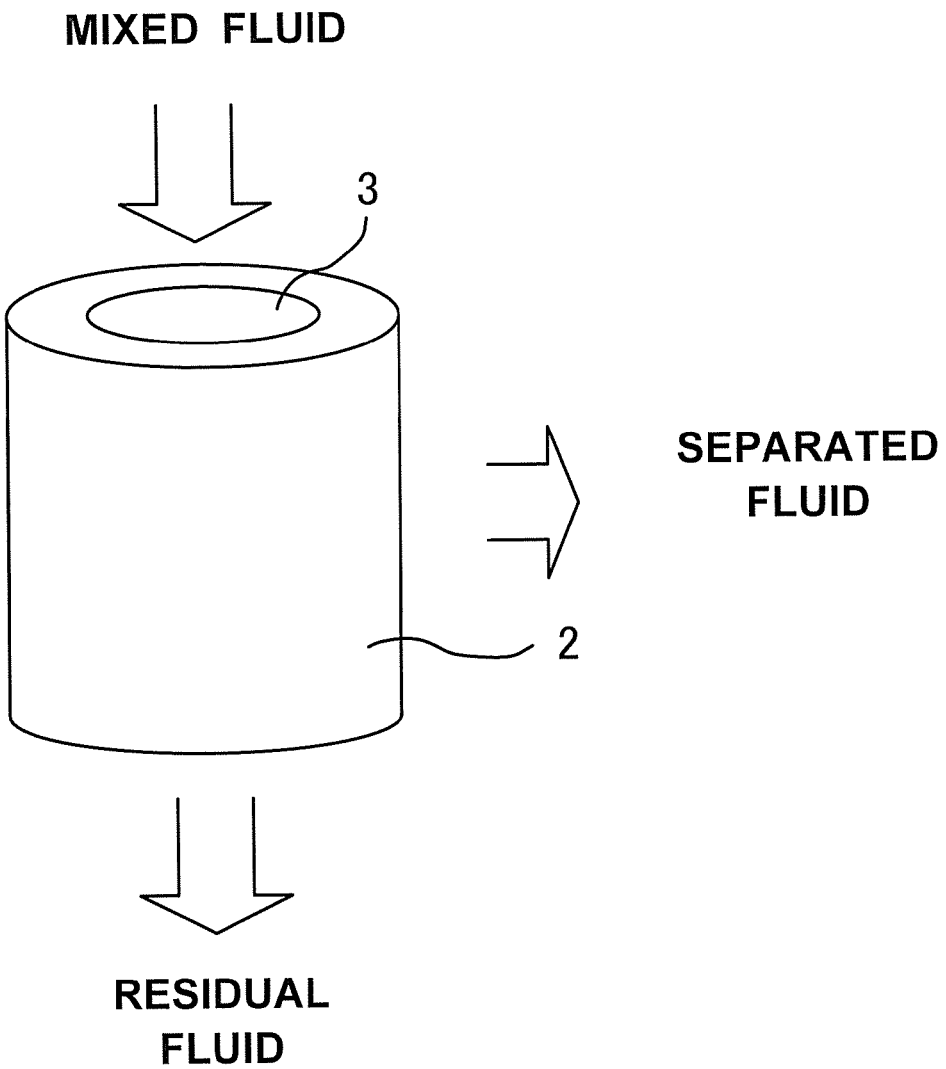
FIG. 2B illustrates an example of a hollow cylindrical separation element.

FIG. 2B illustrates an example of a hollow cylindrical separation element. As illustrated in FIG. 2B, there may be only one through-hole 3, which serves as a fluid channel.

Figure 2C:
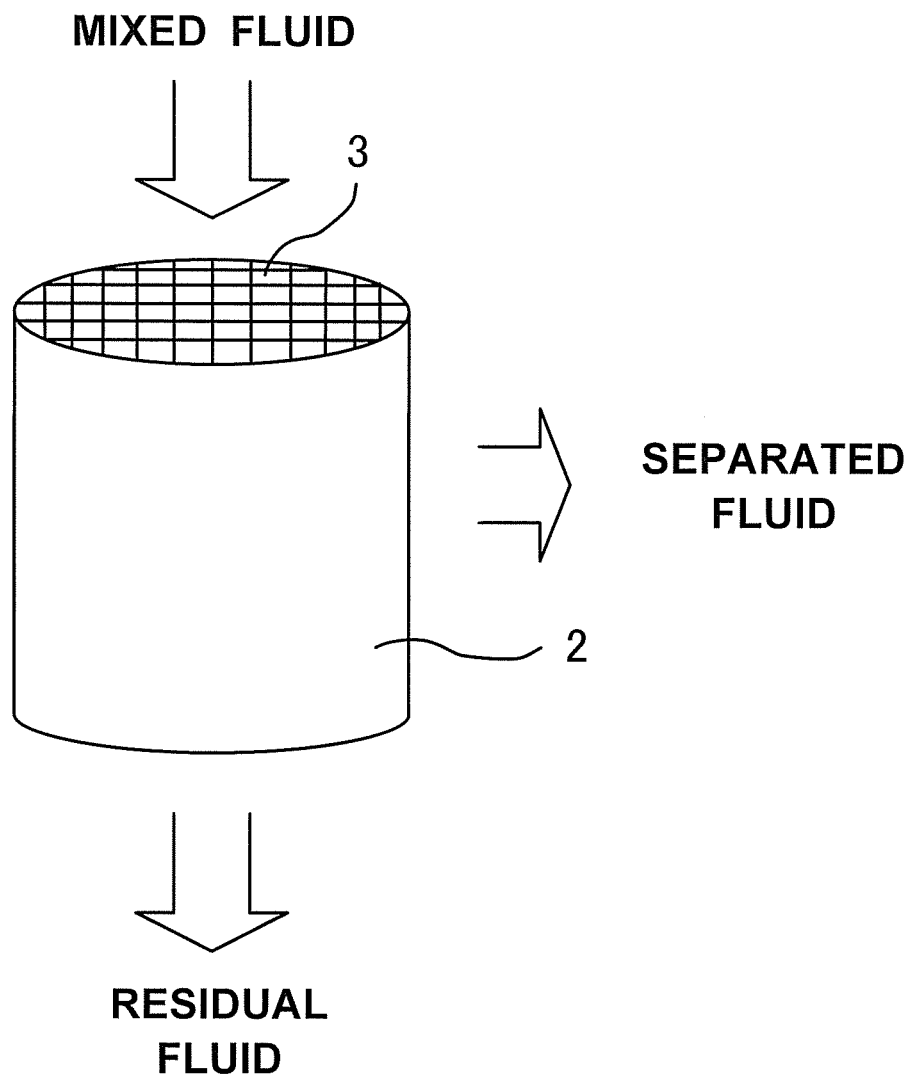
FIG. 2C illustrates an example of a separation element having rectangular through-holes.

FIG. 2C illustrates an example of a separation element having rectangular through-holes. The separation element 2 illustrated in FIG. 2C has rectangular through-holes 3. The length of the fluid channel may be increased by sealing a part of ends of some of the through-holes 3 illustrated FIG. 2C so that a fluid can pass from the through-holes 3 to adjacent through-holes 3 at the end portions.

Figure 2D:
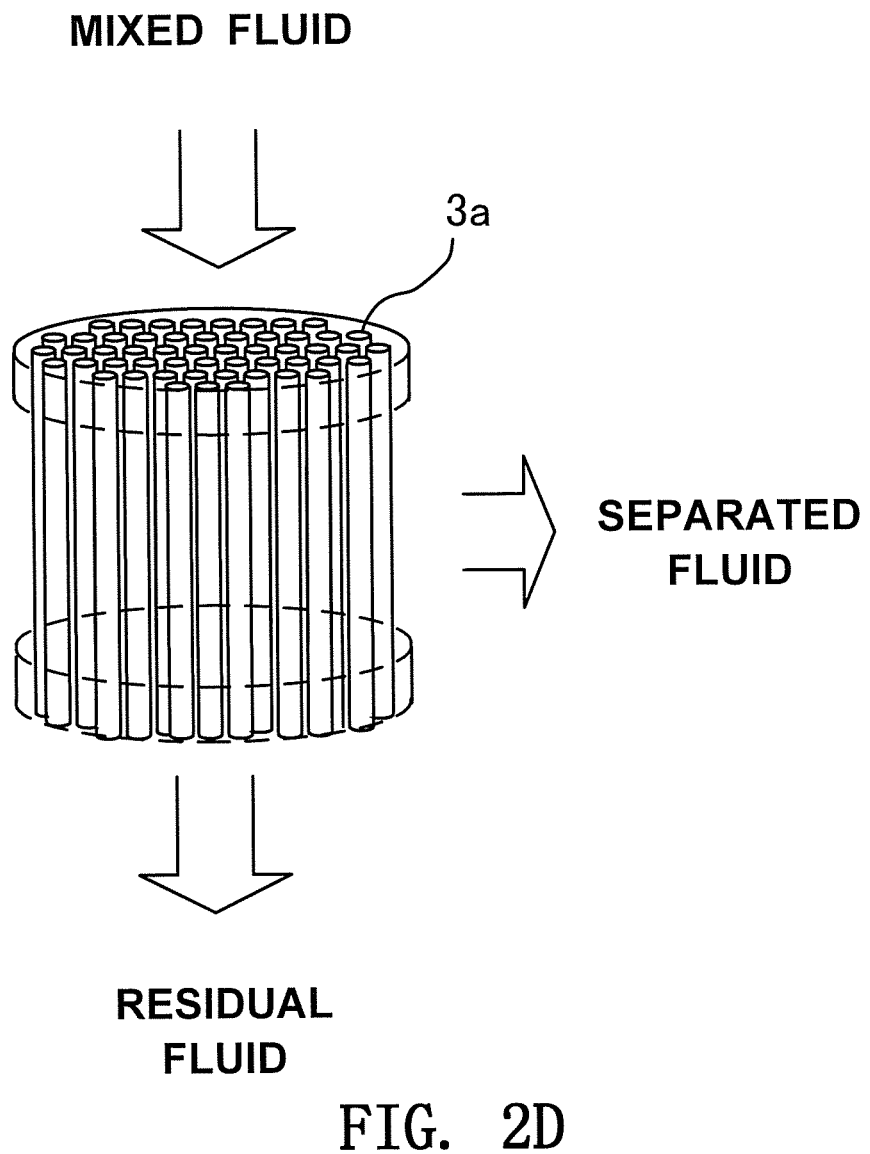
FIG. 2D illustrates an example of a tubular separation element.

FIG. 2D illustrates an example of a tubular separation element. The tubular separation element includes a bundle of a large number of tubes 3a, whose one or both ends is/are fixed. Each of the tubes 3a itself serves as a base member having a separation function.

The average pore diameter of the porous material of the separation membrane and the average pore diameter of the porous body of the base member are appropriately determined in accordance with a desired separation capability (the particle diameter of a substance that is to be passed and the particle diameter of a substance that is to be trapped) and the amount of fluid to be passed (the processing amount). In general, the average pore diameter of the porous material of the separation membrane is in the range of about 0.1 nm to 1.0 μm, and the average pore diameter of the porous body of the base member is in the range of about one to several hundred micrometers.

The materials of the base member and the separation membrane of the separation element 2, which are inorganic materials, are not particularly limited, as long as a porous structure can be formed from the inorganic material. Examples of such inorganic materials include zeolite, zirconia, α-alumina, γ-alumina, silica, cordierite, mullite, titanium oxide, fused silica, silicon carbide, silicon nitride, aluminium titanate, and lithium aluminium silicate. The separation element 2 may be made from carbon.

A zeolite membrane is an example of a separation membrane for separating carbon dioxide (hereinafter referred to as $CO_2$). A zeolite membrane is a membrane that performs gas separation using pores in a crystal structure, which is represented by that of Deca-Dodecasil 3R (DDR) zeolite. DDR zeolite, which is preferably used as a $CO_2$ separation membrane, is mainly composed of silica ($SiO_2$) and has a polyhedral structure having pores formed of eight-membered ring of oxygen atoms. The pore diameter of DDR zeolite is as small as 4.4×3.6 angstroms, so that DDR zeolite can selectively separate $CO_2$.

By using a separation membrane for separating $CO_2$, $CO_2$ can be selectively separated from, for example, a mixed fluid including methane and $CO_2$.

A hydrogen-permselective metal membrane is an example of a separation membrane for separating hydrogen. A hydrogen-permselective metal membrane is a membrane that employs the solubility of hydrogen in a hydrogen-permselective metal (such as palladium (Pd) or a palladium alloy).

2. Method of Inserting/Removing Separation Module into/from Casing

Figure 3:
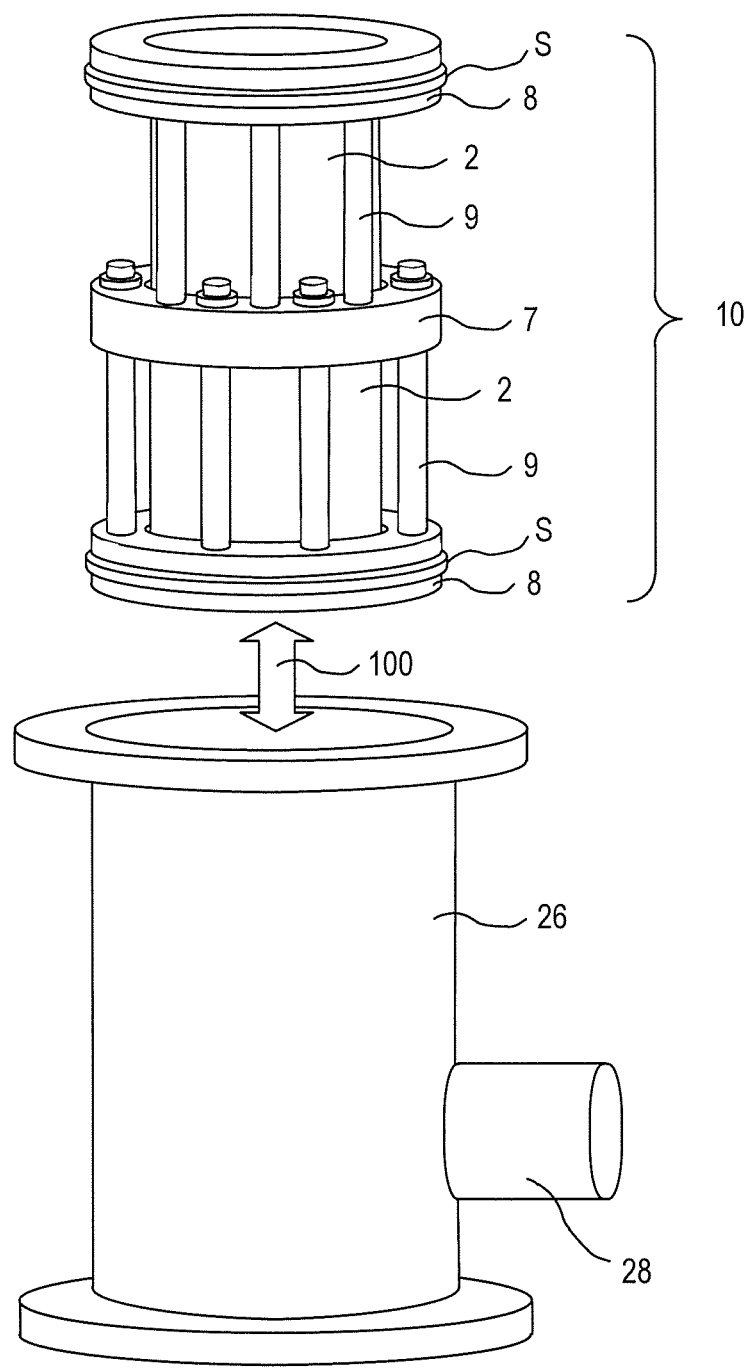
FIG. 3 is a schematic view illustrating how a separation module is inserted into and removed from a casing.

FIG. 3 is a schematic view illustrating how a separation module is inserted into and removed from a casing. The separation module 10 is sized so as to be insertable into a cylindrical body 26 of the casing 20. Therefore, as indicated by arrow 100, the separation module 10 can be inserted into the casing 20 by pushing the separation module 10 downward from one end of the casing 20, and the separation module 10 can be removed from the casing 20 by pulling the separation module 10 upward from one end of the casing 20. In FIG. 3, the separation module 10 is inserted or removed vertically. However, when the fluid separation apparatus 1 is placed horizontally, the separation module 10 is inserted or removed horizontally.

When the separation module 10 has been removed from the casing 20, the separation elements 2 can be replaced on the spot by removing the coupling jigs 9. The separation module 10 may be carried to another workplace, where the separation module 10 can be scrutinized and repair and replacement can be performed.

Thus, the separation module 10 can be inserted into and removed from the casing 20 from one end of the casing 20. Therefore, the efficiency in replacing the separation element and the efficiency in assembling the fluid separation apparatus can be considerably improved as compared with the separation apparatus described in Patent Document 2, with which flanges need to be disassembled for each of the separation elements.

Figure 4:
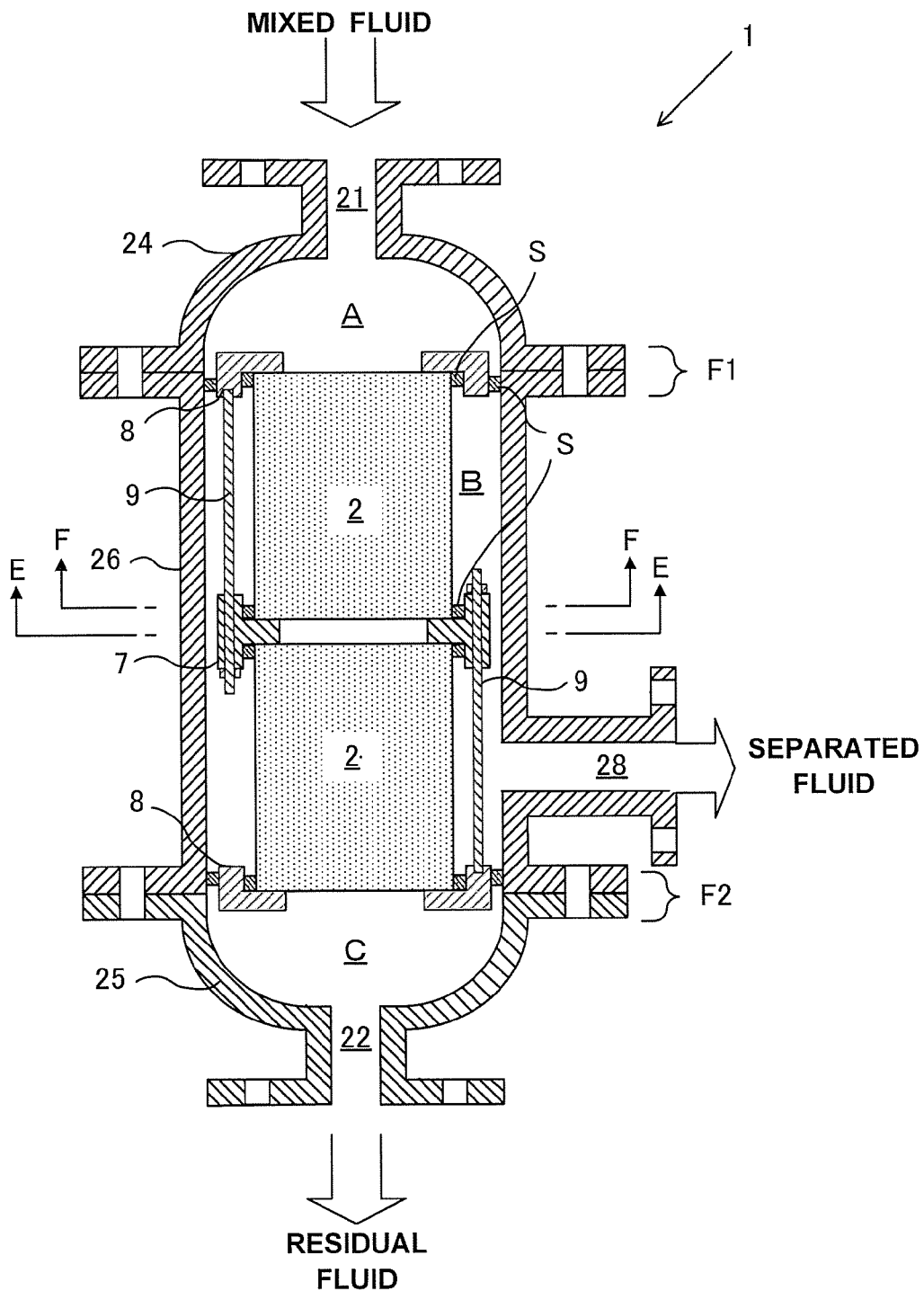
FIG. 4 is a sectional view illustrating an example of a fluid separation apparatus.

FIG. 4 is a sectional view illustrating an example of a fluid separation apparatus. Referring to FIG. 4, components of the fluid separation apparatus are described below in more detail. Any fluid, such as a gas, a liquid, or a supercritical fluid, may be subjected to separation.

(A) Casing

The casing 20 includes: the mixed fluid inlet 21; the separated fluid outlet 28, through which a selectively separated fluid is discharged; and the residual fluid outlet 22, through which the residual fluid that remains after the selective separation has been performed is discharged.

The casing 20 may include an inlet-side cover member 24, an outlet-side cover member 25, and the cylindrical body 26 disposed between the members 24 and 25. In this case, flange portions F1 are formed at an end of the inlet-side cover member and at one end of the cylindrical body 26, and the flange portions F1 are sealingly connected to each other using a seal member such as a gasket or an O-ring. Flange portions F2 are formed at an end of the outlet-side cover member 25 and at the other end of the cylindrical body 26, and the flange portions F2 are sealingly connected to each other, as with the flange portions F1. The casing 20 of the fluid separation apparatus 1 does not have any other flange portions.

The material of the casing 20 is appropriately selected from materials such as stainless steel with consideration of the processing condition and the corrosiveness of fluids. In FIG. 1, the cylindrical body 26 of the casing 20 is illustrated by broken lines. In the drawings, the separated fluid outlet 28 is formed on a side of one of the separation elements that is located adjacent to the residual fluid outlet. However, a plurality of separated fluid outlets 28 may be formed in the casing 20 so as to correspond to the positions of the separation elements.

The wall of the casing may have a thickness such that the casing can hold a fluid having a pressure in the range of 1 to 15 MPaA.

For example, in the case of separating $CO_2$ from an associated petroleum gas that is obtained from an oil well in the process of enhanced oil recovery (EOR), the gas pressure is low because the gas has been separated from oil under reduced pressure. In order to reduce the volume flow rate of gas and reduce the membrane area, a gas fluid is pressurized to a pressure higher than 1 MPaA, and is then processed using the fluid separation apparatus 1.

In the case of separating $CO_2$ from natural gas produced in a gas field to obtain a methane-rich gas as a residual fluid, the pressure of the natural gas is considerably high, and the design pressure may be as high as 15 MPaA. Therefore, the fluid separation apparatus 1 need to have a high pressure resistance. For example, according to "Pipe Flanges and Flanged Fittings (ASME B16.2-2009)", in the case of EOR processing, the design pressure may be 1 MPaA and the minimum thickness of a flange is 31.8 mm (where the design temperature range is −29 to 100° C. and the inner diameter of the casing 20 is 12 inches (class 150)). In the case of natural gas processing, the design pressure may be as high as 15 MPaA (the same size) and the minimum thickness of a flange is 123.9 mm.

Thus, the higher the pressure of a fluid, the thicker the flanges F1 and F2. If a casing has a heavy and thick flange in its middle, the weight of the fluid separation apparatus is increased and thereby maintenance of the apparatus is difficult. In contrast, the casing of this embodiment does not have a flange in its middle, so maintenance can be easily performed.

(B1) First Connection Jig

The first connection jig 7 has an opening through which the channels of the separation elements 2 are connected to each other. The first connection jig 7 is disk-shaped and has an outer diameter larger than that of the separation elements. The first connection jig 7 is disposed between adjacent separation elements 2 so as to isolate the space around the outer peripheral surfaces of the separation element 2 from the space between the separation elements 2.

The first connection jig 7 is provided so as to serially and sealingly connect the separation elements 2 in the casing 20. Seal members S described below are disposed at connection portions between the first connection jig 7 and the separation elements 2. The outer diameter of the first connection jig 7 is smaller than the inner diameter of the casing 20 but larger than the outer diameter of the separation element 2. The inner diameter of the first connection jig 7 is smaller than the outer diameter of the separation element 2.

Figure 5A:
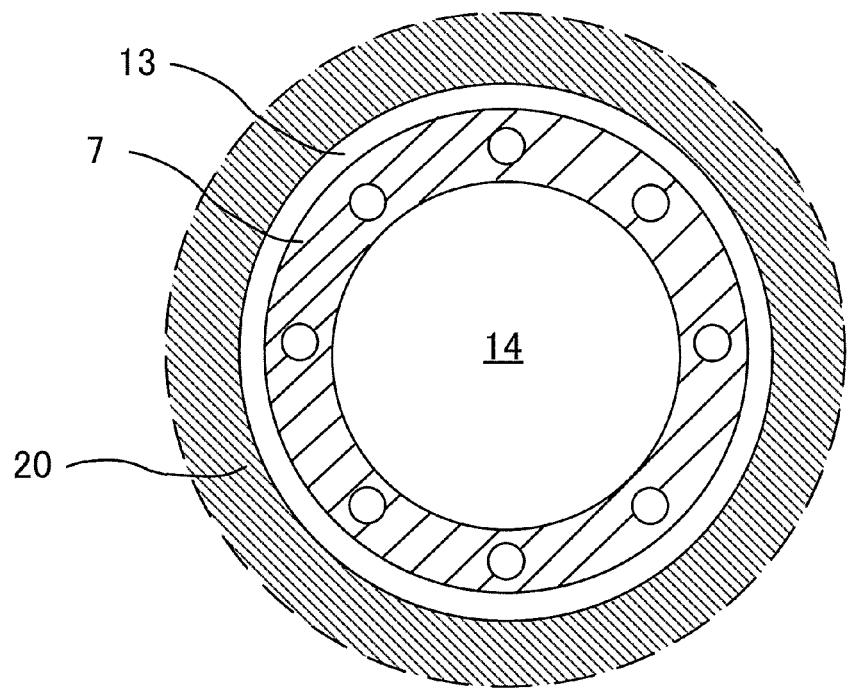
FIG. 5A is a sectional view taken along line E-E of FIG. 4.

The shape of the first connection jig 7 is not particularly limited as long as a desired function can be realized. As illustrated in FIG. 5A, the first connection jig 7 is an annular member having an opening therein. In the example illustrated in FIG. 4, the first connection jig 7 has a vertical cross section that is substantially T-shaped. The first connection jig 7 may have a plurality of openings through which the separation elements are connected to each other.

FIG. 5A is a sectional view taken along line E-E of FIG. 4. The first connection jig 7, which has a vertical cross section that is substantially T-shaped as illustrated in FIG. 4, has a horizontal cross section that has a disk-like shape having an opening as illustrated in FIG. 5A. There is a gap 13 between the casing 20 and the first connection jig 7, and a separated fluid can pass through the gap 13, because the first connection jig 7 has an outer diameter smaller than the inner diameter of the casing 20. The first connection jig 7 has an opening 14 through which the separation elements are connected to each other.

Figure 5B:
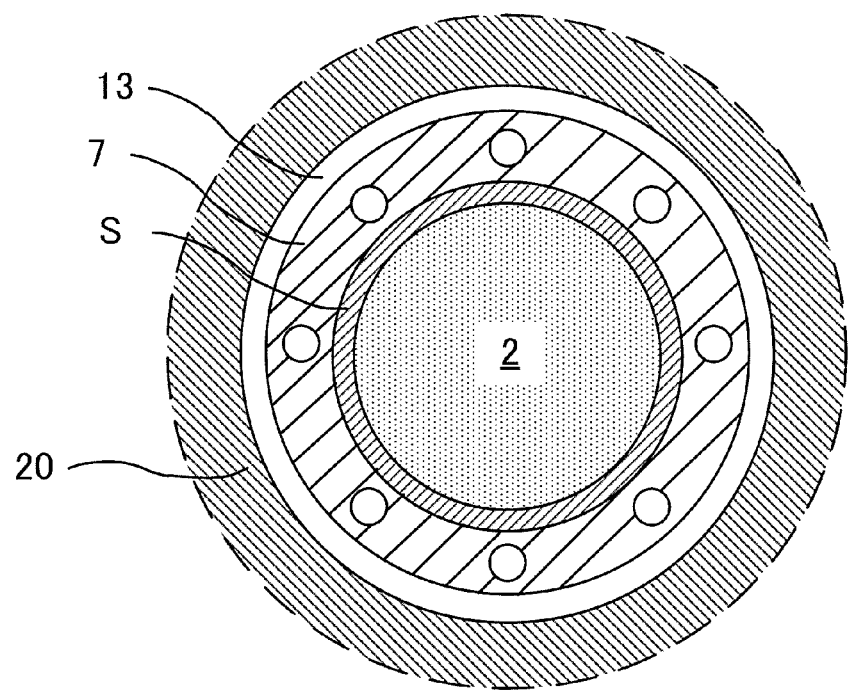
FIG. 5B is a sectional view taken along line F-F of FIG. 4.

FIG. 5B is a sectional view taken along line F-F of FIG. 4. The seal members S are disposed between the first connection jig 7 and the separation elements 2 so as to block passage of fluid. Therefore, a fluid passing through the through-holes in the separation elements 2 is prevented from leaking to the space around the outer peripheral surfaces of the separation elements.

(B2) Second Connection Jig

The second connection jigs 8 each have a disk-like shape having an opening through which the space adjacent to an end surface of a set of the serially arranged separation elements 2 and the channel of a corresponding one of the separation elements 2 are connected to each other. The outer diameter of the second connection jigs 8 is larger than that of the separation elements 2. The second connection jigs 8 are disposed at ends of the set of the serially arranged separation elements 2 so as to isolate the spaces adjacent to the end surfaces of the separation elements 2 from the space around the outer peripheral surfaces of the separation elements 2.

The second connection jigs 8 each may have a plurality of openings through which the space adjacent to the end surface and the channel of the separation element is connected to each other. As shown in FIG. 4, seal members S described below are disposed at a connection portion between each second connection jig 8 and a corresponding one of the separation elements and at a connection portion between each second connection jig 8 and the casing. The second connection jigs 8, which are disposed at ends of the coupled separation elements 2, each have a vertical cross section that is substantially L-shaped as shown in FIG. 4. The second connection jigs 8 each have a horizontal cross section (not shown) that has a disk-like shape having an opening as with the first connection jig 7.

The second connection jigs 8, which are disposed at ends of the set of the serially arranged separation elements 2, may have the same shape or may have different shapes. In this embodiment, the second connection jigs 8 have the same shape as shown in FIGS. 1 and 4. The second connection jigs 8 shown in FIG. 4 are not directly fixed to the flange portions F1 and F2, but are indirectly connected to the cylindrical body 26 through the seal members S.

(B4) Seal Member

The seal members S isolate the spaces adjacent to the end surfaces the set of the serially arranged separation elements from the spaces around the outer peripheral surfaces of the separation elements by contacting the second connection jigs and the inner peripheral surfaces of the casing.

To make the separation module 10 be insertable into and removable from the casing 20, the second connection jigs 8 are not fixed to the casing 20 using flanges. Instead, the second connection jigs 8 are closely attached to the casing 20 using the seal members S.

The seal members S are disposed between the outer peripheral surfaces of the separation elements and the inner peripheral surface of the first connection jig and between the outer peripheral surface of the second connection jigs and the inner side wall of the cylindrical body. Thus, the fluid flowing through the through-holes in the separation elements is prevented from leaking to a space B around the outer peripheral surfaces of the separation element and the space B is isolated from a space C adjacent to an end surface of the set of the separation elements, and thereby leakage of the fluid is prevented. As a result, a specific fluid component can be efficiently separated. The shapes and the materials of the seal members S are not particularly limited. The seal members S may be made by processing an elastic material such as a rubber or a silicone resin so as to form an appropriate shape, such as that of an O-ring, a sheet packing, or a gasket.

It is preferred that the seal members S be disposed so as to be pressed between the first connection jig 7 or each second connection jig 8 and the inner peripheral surface of the cylindrical body 26 so that the seal members S are in pressed contact with the members 7 or 8 and the inner peripheral surface of the cylindrical body 26. By disposing the seal members S so as to be pressed between the first and second connection jigs 7 and 8 and the cylindrical body 26, the closeness of contact between the seal members S and the inner peripheral surface of the cylindrical body 26 and the closeness of contact between the seal members S and the first and the second connection jigs 7 and 8 are increased, and thereby leakage of the fluid is reduced to a considerably small amount.

(B3) Coupling Jig

The coupling jigs couple the first and the second connection jigs to each other. The coupling jigs, for example, are rods each having a bolt and nut joint portion and whose length in the axial direction is adjustable.

The coupling jigs 9 are capable of removably coupling the first connection jigs 7 and the second connections jig 8 that are located adjacent to each other. The coupling jigs 9 each may be have a plate-like shape or a bar-like shape and may be made from a metal such as a stainless steel or from a polymer material having a high strength. In FIG. 3, each of the coupling jigs 9 includes a threaded rod and a nut that can be screwed onto the rod. It is difficult to fix two second connection jigs 8 to each other by using one rod extending through the first connection jig 7 because the rod need to be screwed into the two jigs 8. Therefore, this embodiment is configured such that the coupling jigs 9 are first screwed into the second connection jigs 8 and then the first connection jig 7 can be attached to the coupling jigs 9 by screwing the nuts.

The length of each coupling jig 9 need not correspond to the distance between two adjacent connection jigs. Instead, the coupling jig 9 may have a length corresponding to the length of two or more separation elements 2 that are coupled together.

By using a rod as the coupling jig 9, even if the length of the separation element in the axial direction changes, the separation element can be easily fixed in the separation module by adjusting the length of the rod.

It is preferred that the coupling jigs 9 be arranged at a regular pitch. As shown in FIG. 5A, eight coupling jigs 9 (rods) can be arranged on the first connection jig 7. For example, by arranging four coupling jigs 9 on the mixed-fluid-inlet side of the first connection jig 7 at a pitch of 90° from a start point corresponding to 0° and arranging four coupling jigs 9 on the residual-fluid-inlet side of the first connection jig 7 at a pitch of 90° from a start point corresponding to 45°, the coupling jigs 9 can be arranged so as to be discontinuous in the axial direction. The coupling jigs 9 are fixed to the first connection jig 7 using nuts.

With the above structure, when a plurality of separation elements are disposed in the casing 20, the weight of the fluid separation apparatus per one separation element can be reduced without decreasing the separation capability per footprint as compared with an existing fluid separation apparatus (see Patent Document 2), in which a flange is provided so as to correspond to each of the separation elements. As a result, ease of installing the fluid separation apparatus is increased. When disassembling the fluid separation apparatus 1 in the event of a malfunction of the separation element 2, a plurality of separation elements can be removed as a unit by removing a cover member of the casing 20 and then the conditions of each of the separation elements can be examined. Hence, ease of replacement of the separation elements and other maintenances is increased.

3. Modifications of Fluid Separation Apparatus

Figure 6:
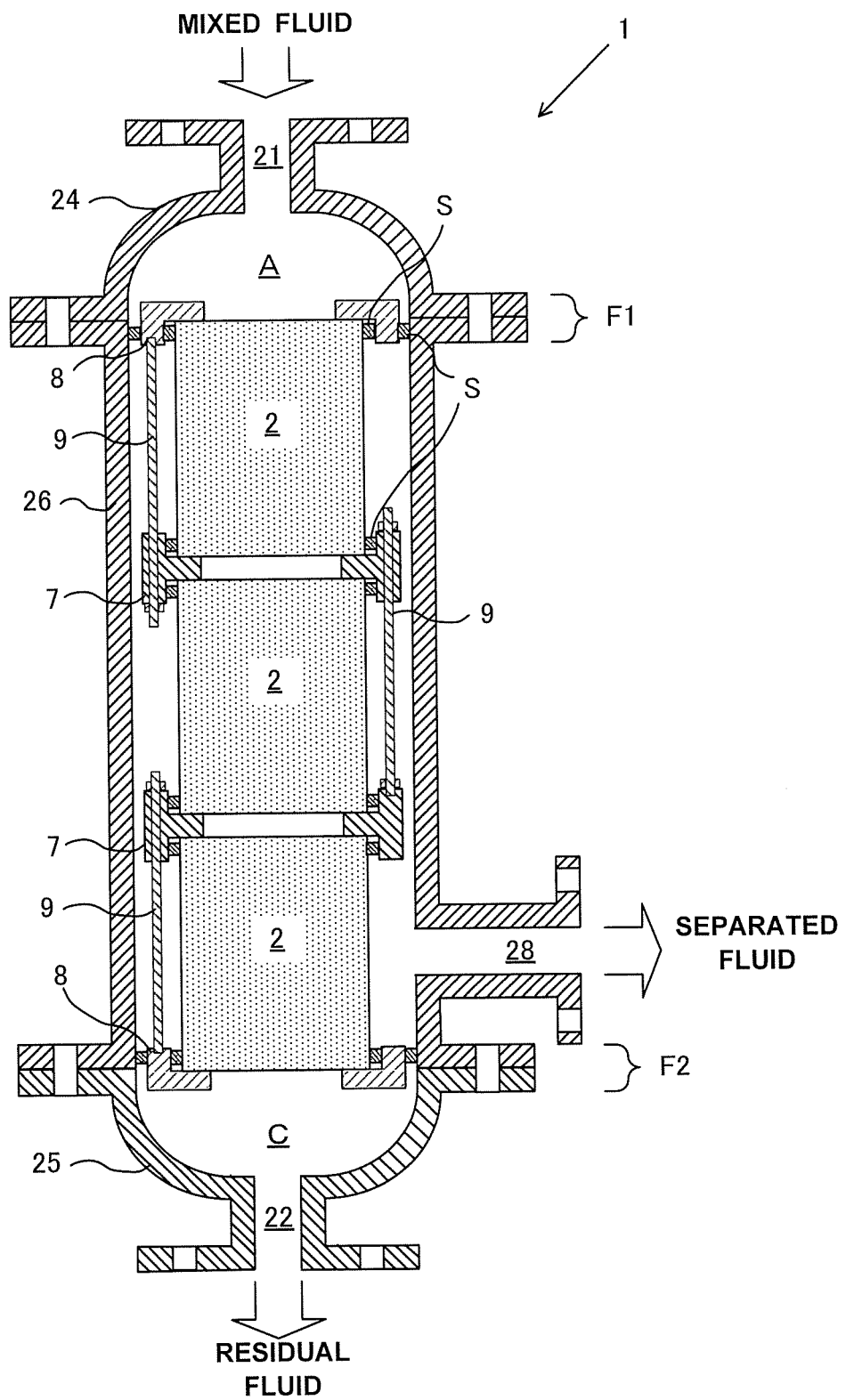
FIG. 6 is a sectional view illustrating an example of a fluid separation apparatus including three separation elements.

FIG. 6 is a sectional view illustrating an example of a fluid separation apparatus including three separation elements. As shown in FIG. 6, the number of separation elements 2 may be two or more. In this case, the number of separation elements 2 is three, and the number of first connection jigs 7 disposed between adjacent pairs of separation elements 2 is two.

Figure 7:
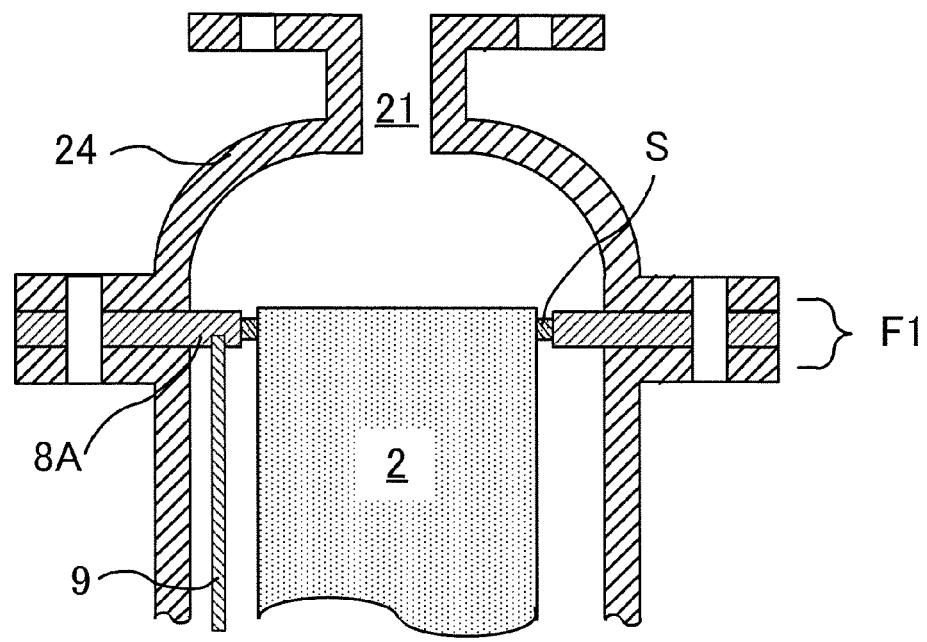
FIG. 7 is a sectional view illustrating a second example of a second connection jig.

FIG. 7 is a sectional view illustrating a second example of a second connection jig. One of the second connection jigs may be a connection jig that have an outer diameter larger than the inner diameter of the casing and is capable of being integrally fixed to the casing using the flange, and the other second connection jig may have an outer diameter smaller than the inner diameter of the casing.

A second connection jig 8A shown in FIG. 7 may be disposed on the side from which the separation module 10 is extracted. The second connection jig 8A is fixed to the flange portion F1. Therefore, the gap shown in FIG. 4, which is formed between each second connection jig 8 and the inner peripheral surface of the casing, need not be sealed, so that the risk of leakage of fluid can be reduced.

Even when the second connection jig 8A is used, a second connection jig 8 shown in FIG. 4 is used on the residual-fluid-discharge side. The separation module 10 can be inserted into and removed from the casing from one end of the casing, because the second connection jig 8 has an outer diameter smaller than the inner diameter of the casing.

Figure 8A:
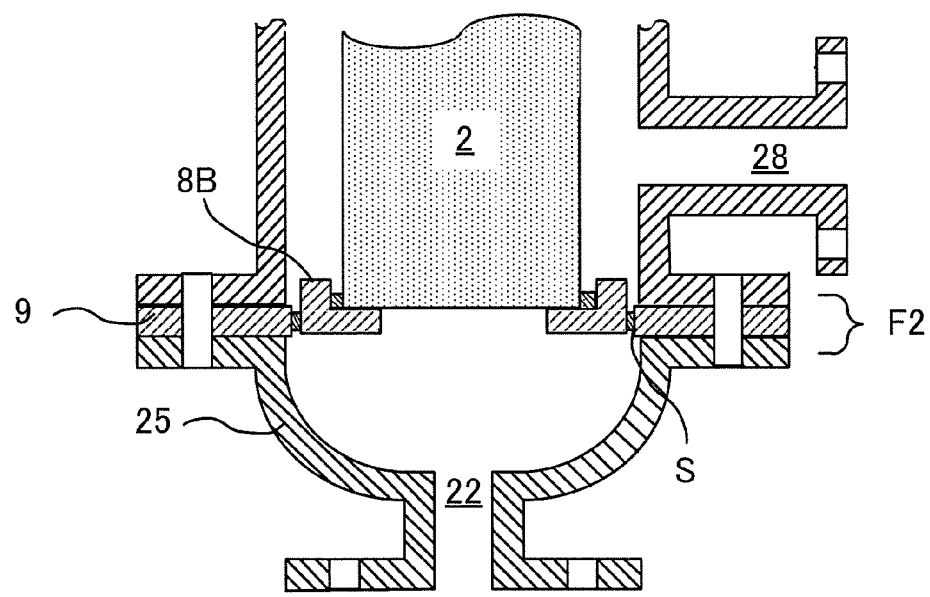
FIG. 8A is a sectional view illustrating a third example of the second connection jig.

FIG. 8A is a sectional view illustrating a third example of the second connection jig. A second connection jig 8B shown in FIG. 8A is indirectly connected via the seal member S to a fixing member 9 that is integrally fixed to the flange portion F2. The fixing member 9 has an inner diameter smaller than that of the cylindrical body 26 of the casing. Therefore, when the separation module 10 is inserted into the casing from the mixed-fluid-inlet side, the seal member S disposed on the outer peripheral surface of the second connection jig 8B can be brought into close contact with the fixing member 9 without contacting the inner surface of the cylindrical body 26.

Figure 8B:
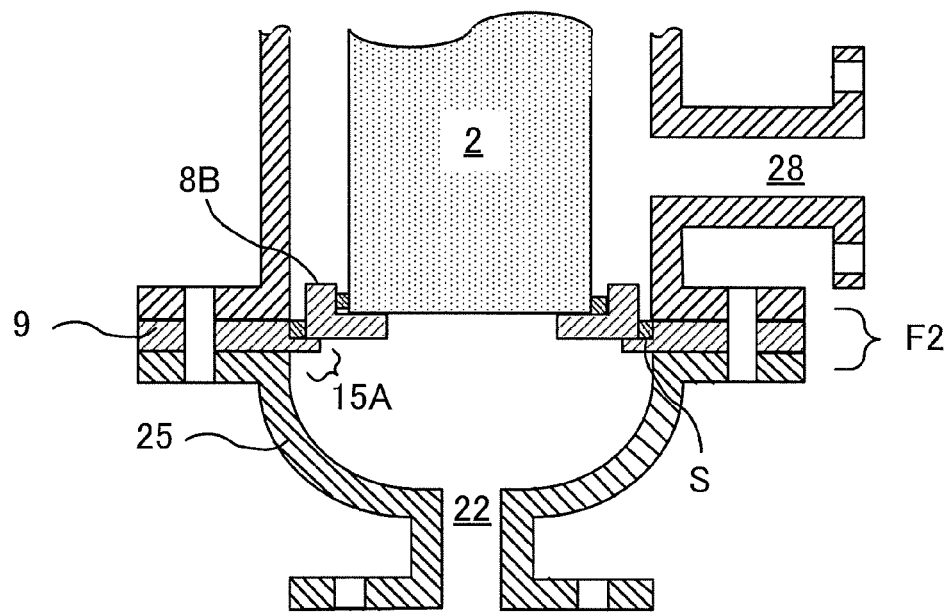
FIG. 8B is a sectional view illustrating an example of a fixing member.

FIG. 8B is a sectional view illustrating a second example of a fixing member. The fixing member 9 shown in FIG. 8B is sandwiched between the inlet-side cover member 24 or the outlet-side cover member 25 and the cylindrical body 26. The fixing member 9 has a disk-like shape having an opening and includes a protrusion 15A that protrudes from a position corresponding to the inner peripheral surface of the casing 20 toward the center of the opening and contacts the second connection jig 8. When inserting the separation module 10 from one side of the casing 20, an end of the separation module in the insertion direction abuts against the protrusion 15A, so that the movement of the separation module 10 in the insertion direction is restrained, whereby the separation module 10 can be disposed at an appropriate position in the casing 20. As shown in FIG. 8A, the fixing member 9 may have an inner diameter smaller than that of the cylindrical body 26 of the casing so that the seal member S can be brought into close contact with the fixing member 9 without contacting the inner surface of the cylindrical body 26.

Figure 8C:
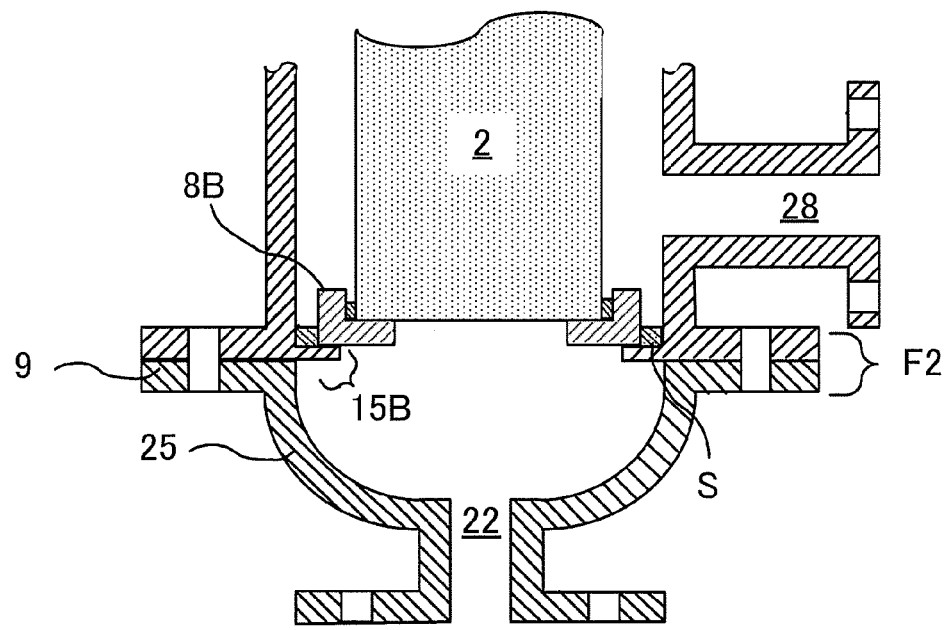
FIG. 8C is a sectional view illustrating a second example of the casing.

FIG. 8C is a sectional view illustrating a second example of the casing. A protrusion 15B, which protrudes toward the center of the casing 20, is formed at an end of the casing 20 as with the fixing member 9 shown in FIG. 8B. Thus, when the separation module 10 has been inserted, the separation module 10 can be immovably disposed at an appropriate position in the casing 20.

Figure 9A:
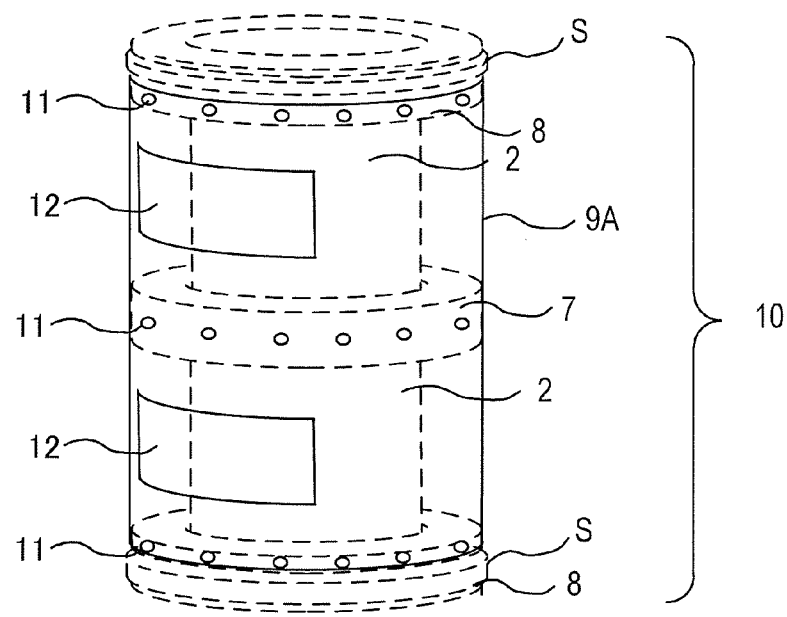
FIG. 9A is a perspective illustrating a second example of a coupling jig.
Figure 9B:
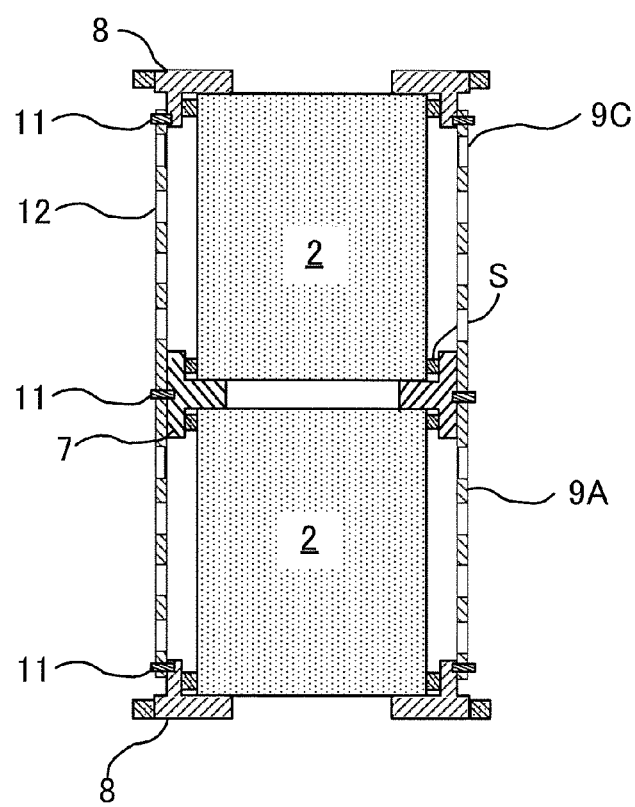
FIG. 9B is a sectional view illustrating the second example of the coupling jig.

FIG. 9A is a perspective view illustrating a second example of a coupling jig, and FIG. 9B is a sectional view illustrating the second example of the coupling jig. A coupling jig 9A shown in FIG. 9A has a hollow cylindrical shape and has openings 12 through which a separated fluid passes. The coupling jig 9A is fixed to the first connection jig 7 and the second connection jigs 8 using fasteners 11 such as bolts and nuts, and thereby the first connection jig 7 and the second connection jigs 8 are integrated with each other. By using the cylindrical coupling jig, the holding strength can be increased.

Figure 10:
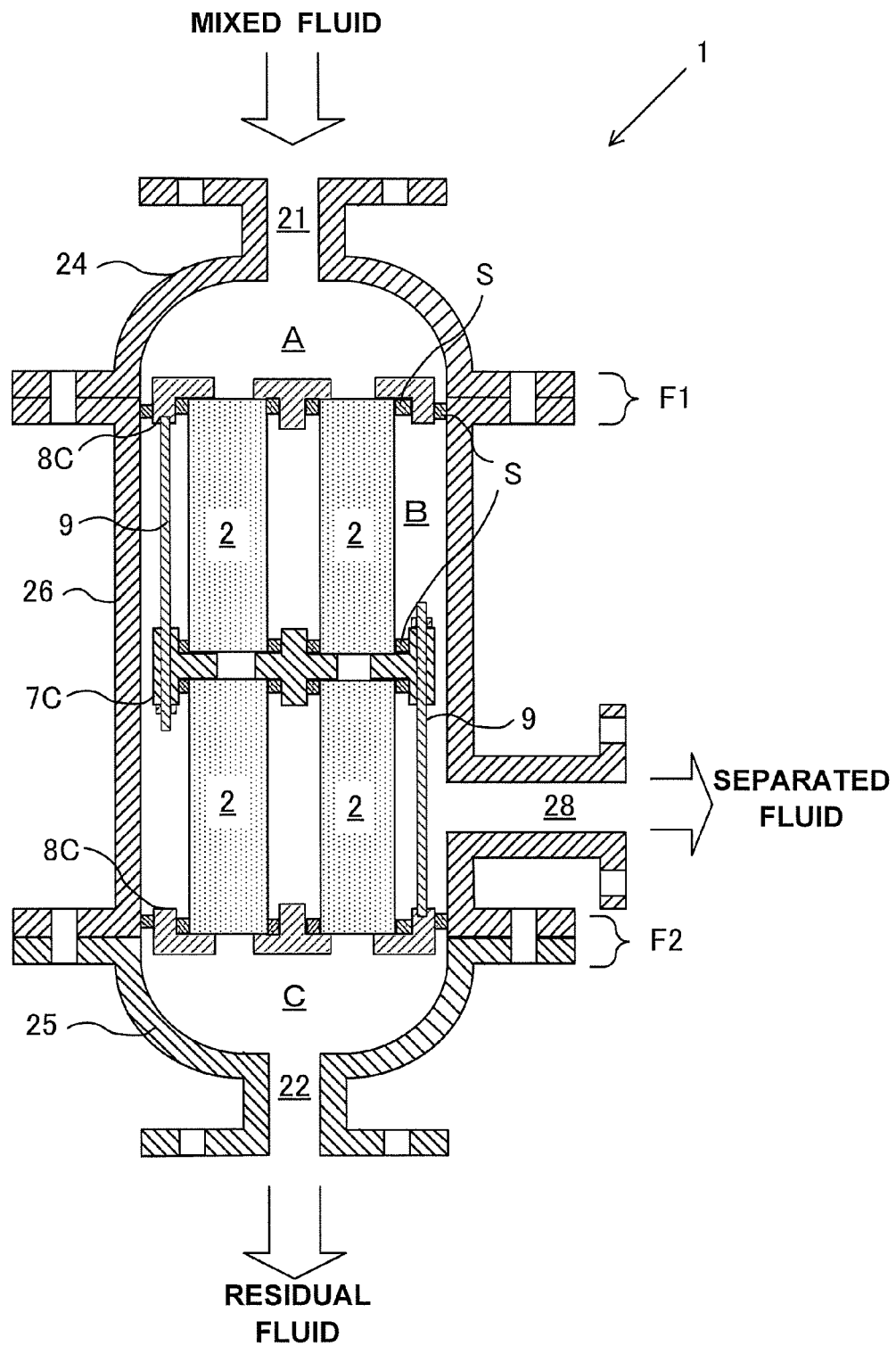
FIG. 10 is a sectional view illustrating an example of a fluid separation apparatus including a separation module in which a plurality of separation element sets, each including serially arranged separation elements, are parallelly arranged.

FIG. 10 is a sectional view illustrating an example of a fluid separation apparatus including a separation module in which a plurality of separation element sets, each including serially arranged separation elements, are parallelly arranged. In a fluid separation apparatus 1A shown in FIG. 10, a plurality of separation element sets, each including serially arranged separation elements, are parallelly arranged, so that not only a desired separation capability can be obtained but also the processing flow rate can be increased. Thus, a high processing flow rate can be achieved by using a smaller number of parallelly arranged fluid separation apparatuses. A first connection jig 7C and a second connection jig 8C shown in FIG. 10 respectively have a larger number of openings than the first connection jig 7 and the second connection jig 8 shown in FIG. 4 in accordance with the number of separation element sets. The plurality of separation element sets are integrated into the separation module 10 by disposing the separation elements between the first connection jig 7 and the second connection jigs 8 and by coupling the first connection jig 7 and the second connection jigs 8 to each other using the coupling jigs 9. The modifications of the first connection jig 7C and the second connection jig 8C, which are shown in FIGS. 7 to 8C, may be used.

4. Exemplary Application of Fluid Separation Apparatus

Figure 11:
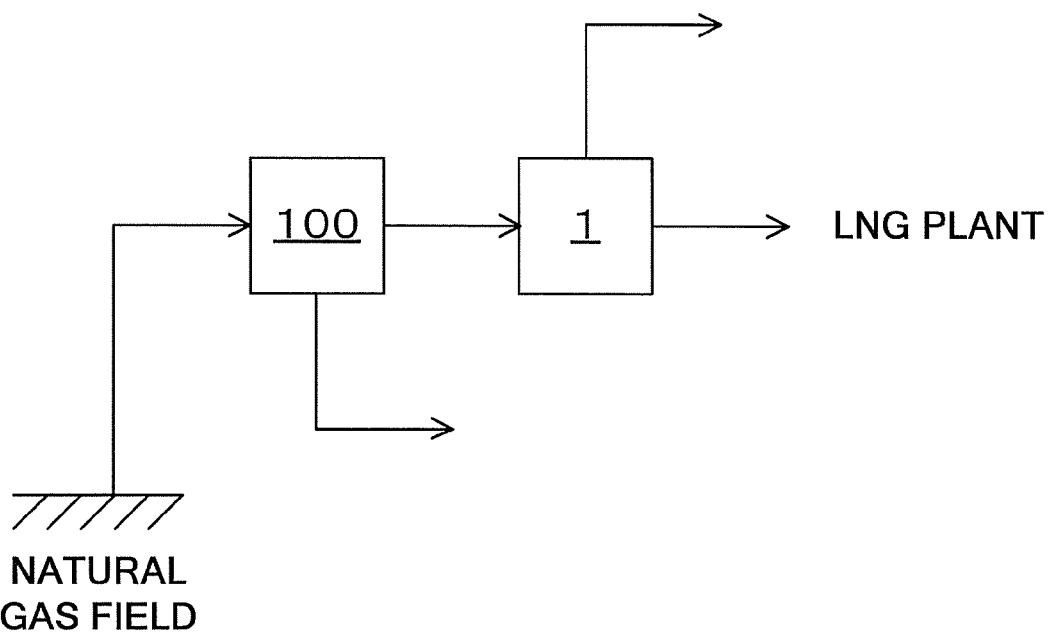
FIG. 11 illustrates an exemplary application of a fluid separation apparatus in a natural gas field.

FIG. 11 illustrates an exemplary application of a fluid separation apparatus in a natural gas field. The fluid separation apparatus 1 for separating $CO_2$ is disposed downstream of preprocessing equipment for removing condensate, water, and impurities. After $CO_2$ has been separated, the gas is used as a material gas for an LNG plant, town gas, and the like. A large number of natural gas fields that produce $CO_2$-rich gases have been found, and utilization of such $CO_2$-rich gas fields has been attracting attention. In the case of separating $CO_2$, a membrane separation method has advantages over an existing absorption separation method using amine solvent or the like in terms of low initial cost, reduction in the operation cost for makeup of amine or the like, and reduction in the footprint.

The embodiments described above are provided only for examples, and combinations, changes and variations of the constituting elements of the respective embodiments are known to one of ordinary skill in the art. It should be understood that various changes could be made hereto without departing from the spirit of this invention and the scope of this invention as described in the claims.

What is claimed is:

1. A fluid separation apparatus that selectively separates a specific fluid component from a mixed fluid, comprising:
   a casing that includes a mixed fluid inlet, a separated fluid outlet through which a selectively separated fluid is discharged, and a residual fluid outlet through which a residual fluid that remains after selective separation has been performed is discharged; and
   a separation module in which a set of a plurality of serially arranged separation elements is disposed, each of the separation elements having a channel through which the mixed fluid flows in an axial direction and selectively separating the specific fluid component as a cross flow perpendicular to a flow direction of the mixed fluid, the separation module being insertable into the casing from an end of the casing,
   wherein the separation module includes:
   a first connection jig that is disposed between adjacent separation elements so as to isolate a space around outer peripheral surfaces of the separation elements from a space between the separation elements, the first connection jig having an opening through which the channels are connected to each other and having a disk-like shape having an outer diameter larger than an outer diameter of the separation elements,
   second connection jigs that are disposed at two ends of the set of the plurality of serially arranged separation elements such that each second connection jig isolates a space adjacent to an end surface of the set of the serially arranged separation elements from the space around the outer peripheral surfaces of the separation elements, each second connection jig having an opening through which the space adjacent to the end surface is connected to a corresponding one of the channels, and
   a coupling jig that couples the first and second connection jigs to each other.

2. The fluid separation apparatus of claim 1, further comprising:
   a seal member that isolates the space adjacent to the end surface of the set of the plurality of serially arranged separation elements from the space around the outer peripheral surfaces of the separation elements by contacting the second connection jigs and an inner peripheral surface of the casing.

3. The fluid separation apparatus of claim 1, wherein the casing includes an inlet-side cover member in which the mixed fluid inlet is formed, an outlet-side cover member in which the residual fluid outlet is formed, and a cylindrical body in which the separated fluid outlet is formed and in which the separation module is inserted, and at least one of the inlet-side cover member and the outlet-side cover member is sealingly connectable to the cylindrical body using a flange, the fluid separation apparatus further comprising:
a fixing member disposed between the inlet-side cover member or the outlet-side cover member and the cylindrical body, the fixing member having a disk-like shape having an opening, and including a protrusion that protrudes toward a center of the opening from a position corresponding to an inner peripheral surface of the casing and contacts the second connection jigs.

4. The fluid separation apparatus of claim 1,
wherein the casing includes an inlet-side cover member in which the mixed fluid inlet is formed, an outlet-side cover member in which the residual fluid outlet is formed, a cylindrical body in which the separated fluid outlet is formed and in which the separation module is inserted, at least one of the inlet-side cover member and the outlet-side cover member being sealingly connectable to the cylindrical body using a flange, and
wherein each second connection jig is disposed in the cylindrical body in a manner such that the second connection jig is removable after the inlet-side cover member or the outlet-side cover member has been removed.

5. The fluid separation apparatus of I claim 1, wherein the casing has a wall thickness with which the casing is capable of holding a fluid having a pressure in a range of 1 to 15 MPaA.

6. The fluid separation apparatus of claim 3, wherein one of the second connection jigs has an outer diameter larger than an inner diameter of the casing and is capable of being integrally fixed to the casing using the flange, and the other of the second connection jigs has an outer diameter smaller than the inner diameter of the casing.

7. The fluid separation apparatus of claim 1, wherein the coupling jig is a rod whose length in the axial direction is adjustable and that has a joint portion including a bolt and a nut.

8. The fluid separation apparatus of claim 1, wherein the coupling jig is cylindrical.

9. The fluid separation apparatus of claim 1, wherein a plurality of sets of the plurality of serially arranged separation elements are parallelly arranged in the separation module.

10. The fluid separation apparatus of claim 1, wherein each second connection jig has a disk-like shape having an outer diameter larger than the outer diameter of the separation elements.

11. The fluid separation apparatus of claim 1, wherein the cross flow is from inside to outside of the separation element.

12. The fluid separation apparatus of claim 4, wherein one of the second connection jigs has an outer diameter larger than an inner diameter of the casing and is capable of being integrally fixed to the casing using the flange, and the other of the second connection jigs has an outer diameter smaller than the inner diameter of the casing.

13. A method of selectively separating a mixed fluid using a fluid separation apparatus that selectively separates a specific fluid component from the mixed fluid, the fluid separation apparatus including
a casing that includes a mixed fluid inlet, a separated fluid outlet through which a selectively separated fluid is discharged, and a residual fluid outlet through which a residual fluid that remains after selective separation has been performed is discharged; and
a separation module in which a set of a plurality of serially arranged separation elements is disposed, each of the separation elements having a channel through which the mixed fluid flows in an axial direction and selectively separating the specific fluid component as a cross flow perpendicular to a flow direction of the mixed fluid, the separation module being insertable into the casing from an end of the casing,
wherein the separation module includes
a first connection jig that is disposed between adjacent separation elements so as to isolate a space around outer peripheral surfaces of the separation elements from a space between the separation elements, the first connection jig having an opening through which the channels are connected to each other and having a disk-like shape having an outer diameter larger than an outer diameter of the separation elements,
second connection jigs that are disposed at two ends of the set of the plurality of serially arranged separation elements such that each second connection jig isolates a space adjacent to an end surface of the set of the serially arranged separation elements from the space around the outer peripheral surfaces of the separation elements, each second connection jig having an opening through which the space adjacent to the end surface is connected to a corresponding one of the channels, and
a coupling jig that couples the first and the second connection jigs to each other,
selectively separating the specific fluid component as the cross flow perpendicular to the flow direction of the mixed fluid using the separation elements;
isolating a fluid that has been selectively separated from the mixed fluid using the first connection jig; and
isolating the selectively separated fluid from the mixed fluid using the second connection jigs.

14. The method of claim 13, wherein the mixed fluid has a pressure in a range of 1 to 15 MPaA.

15. The method of claim 13, wherein each second connection jig has a disk-like shape having an outer diameter larger than the outer diameter of the separation elements.

16. The method of claim 13, wherein the cross flow is from inside to outside of the separation element.

* * * * *